F. E. Nearing.
Combined Rake & Tedder.
Nº 91,037. Patented Jun. 8, 1869.
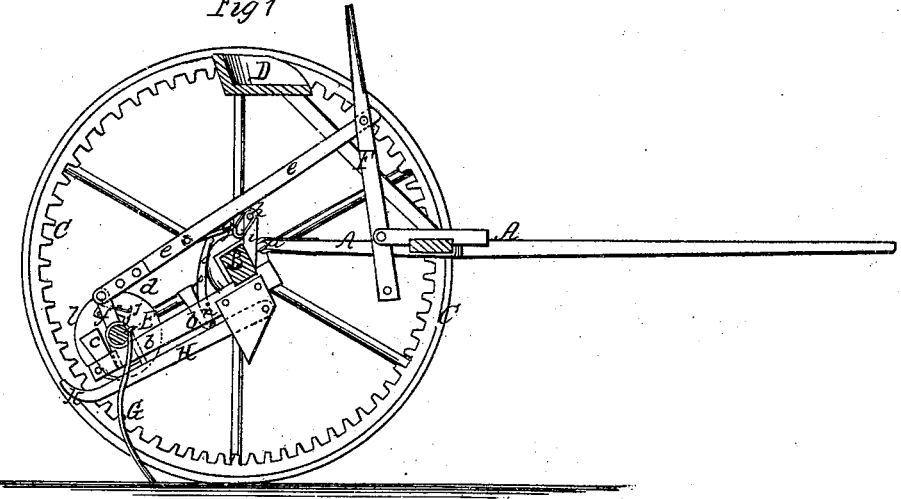
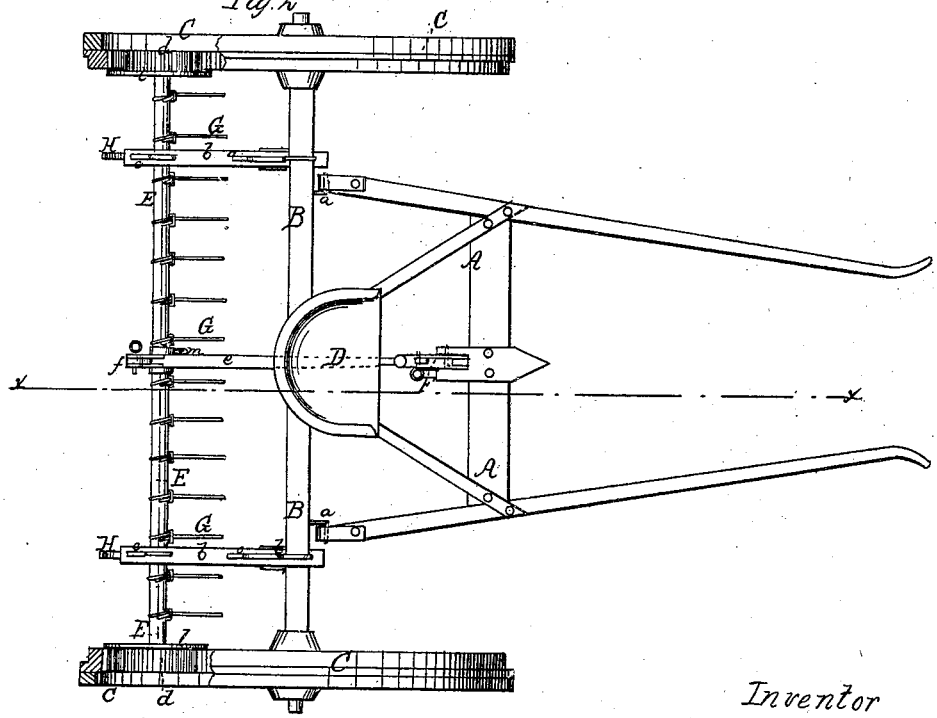
Witnesses
John F. Brooks
Inventor
F. E. Nearing
per Munn & Co
Attorneys.

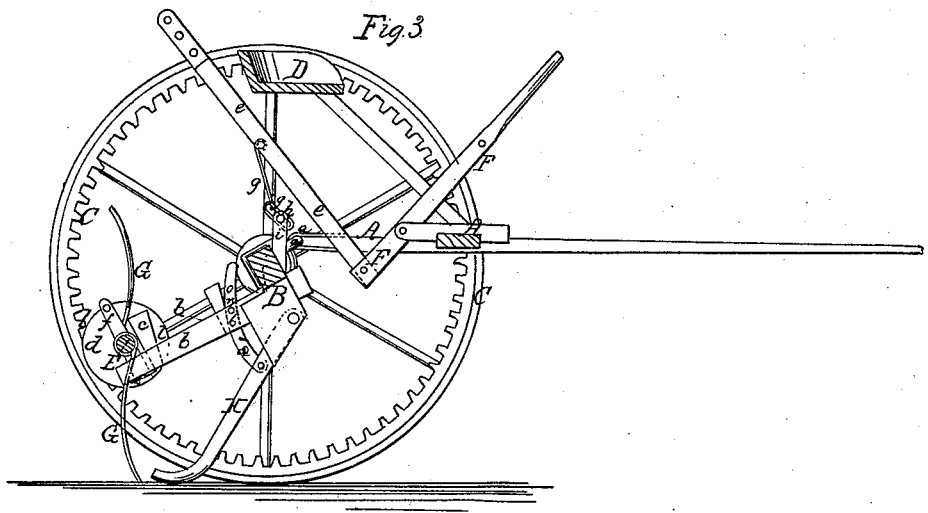
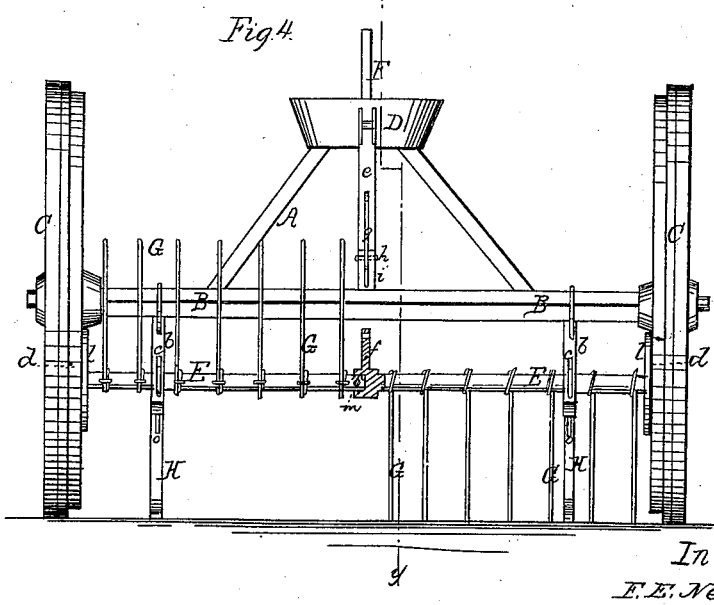

UNITED STATES PATENT OFFICE.

FREDERICK E. NEARING, OF BROOKFIELD, ASSIGNOR TO HIMSELF AND WILLIAM H. HUBBELL, OF DANBURY, CONNECTICUT.

IMPROVEMENT IN COMBINED HORSE-RAKE AND HAY-SPREADER.

Specification forming part of Letters Patent No. 91,037, dated June 8, 1869.

*To all whom it may concern:*

Be it known that I, FREDERICK E. NEARING, of Brookfield, in the county of Fairfield and State of Connecticut, have invented a new and Improved Hay Rake and Tedder; and I do hereby declare that the following is a full, clear, and exact description thereof, which will enable others skilled in the art to make and use the same, reference being had to the accompanying drawing, forming part of this specification, in which—

Figure 1, Sheet I, represents a vertical section of my improved hay-rake, taken on the plane of the line $x\ x$, Fig. 2. Fig. 2, Sheet I, is a plan or top view, partly in section, of the same. Fig. 3, Sheet II, is a vertical section of the same, showing it transformed into a hay-tedder, the plane of section being indicated by the line $y\ y$, Fig. 4. Fig. 4 is a rear elevation, partly in section, of the same.

Similar letters of reference indicate corresponding parts.

This invention relates to a new horse hay-rake which is so constructed that it can be readily transformed into a hay-tedder, and which is otherwise of very simple and convenient construction.

The invention consists, first, in making the rake-head of two or more parts, so jointed that some parts can be turned to make the teeth project at different angles from the head when it is desired to use the device for turning hay.

The invention finally consists in providing a novel system of levers for raising or lowering the rake-head, and for swinging the rake-teeth forward on the ground, as hereinafter more fully described, said levers being changed for the rake and tedder to be adapted to the different functions to be performed.

The invention also consists in providing supporting-arms on the apparatus for preventing the teeth of the tedder from being injured on uneven ground.

A in the drawing represents the frame of my improved rake, to which the axle B is hinged at $a\ a$, as in Fig. 2. The wheels C C are hung loose at the ends of the axle, and are provided with internal gearing, as shown in Figs. 1 and 3. The driver's seat D is supported on the frame in suitable manner. In the outer ends of arms $b\ b$, that project backward from the axle B, are slots for supporting the rake-head E. When this rake-head is to be used on the rake it is put into the inner ends of the slots in $b$ and held inward by means of wedges $c$, as in Fig. 1, so that pinions $d$, arranged on the ends of the rake-head, will be out of gear with the wheels C; but when to be used as a tedder, the rake-head is moved out in the slots to throw the pinions $d$ into gear with the toothed inner edges of the wheels C, and is held out by the wedges $c$, that are placed into the inner ends of the slots. When thus thrown into gear the rake-head will be revolved. When the machine is drawn forward on the rake, however, it is not revolved, and is prevented from turning by being connected, by means of a rod, $e$, with a lever, F, which is pivoted to the front part of the frame. The outer end of the rod $e$ is in this case pivoted to a lug, $f$, that projects from the rake-head. The middle portion of the rod $e$ is pivoted to a slotted bar, $g$, through the slot of which is fitted a pin, $h$, connecting it with a lug or lugs, $i$, that project from the axle, as in Fig. 1.

From the rake-head project downward the rake-teeth G G, which are of suitable construction, and which can be raised to dump a swath by swinging the lever F, whereby the axle B is turned on its hinges $a$. When the teeth are on the ground there is a small lateral play allowed to them by the slot in the bar $g$, which enables the driver, by a slight motion of the lever, to carry the points of the teeth slightly forward on the ground.

The rake-head consists of two or more pieces fitted together, so that the end of one piece is inserted into a socket of the other piece, as shown by section in Fig. 4. A pin, $m$, connects and locks the two parts thus united, so that their teeth G are either in line, as in Fig. 2, or opposite each other, as in Figs. 3 and 4, or at any other desired angle. In the latter position the teeth are used for turning the hay.

In order to allow the head E to revolve on the tedder, the rod $e$ must be disconnected from the lug $f$, and is attached to the lower end of the lever F, as in Fig. 3. Thereby the control as to the height of the teeth above the ground is still retained.

As it may be desired to have the device in the tedder position without revolving the rake-head, I have arranged the pinions $d$ loose on the head and connect them by pawls $j$ and ratchets, so that by lifting the pawls out of the ratchets the device may at any time be caused to let the pinions turn loose on the head.

The pinions have shoulders $l$ that fit against the inner faces of the wheels C. Their object is to guide and steady the head and to do away with the necessity of providing expensive journals in the arms $b$. H H are bars pivoted to the under sides of the arms $b$. They can on the tedder be swung down, so that their rounded ends will rest on the ground, as in Fig. 3, to prevent the revolving teeth from being injured by the contact with the ground. On the rake these bars H are raised out of the way, as in Fig. 1. They can, by pins $n$ and notched arms $o$, be locked in any desired position to the bars $b$.

Having thus described my invention, what I claim as new, and desire to secure by Letters Patent, is—

1. The rake-head E, consisting of several pieces, that are so connected that the teeth G will be in line for a rake or at suitable angles for a tedder, as specified.

2. The combination of the rake-head E, which is made to revolve on the tedder, with the rod $e$, lever F, and slotted bar $g$, all arranged and operating substantially as herein shown and described.

3. The pivoted supporting-arms H, adjustable in the arms $b\ b$ by means of the curved racks $o$ and pins $n$, to prevent the revolving teeth from being injured by contact with the ground, as herein shown and described.

FREDERICK E. NEARING.

Witnesses:
    FRANK BLOCKLEY,
    ALEX. F. ROBERTS.